US010365651B2

(12) United States Patent
Arsenian et al.

(10) Patent No.: US 10,365,651 B2
(45) Date of Patent: Jul. 30, 2019

(54) CONTROL SYSTEM FOR AUTONOMOUS LOCOMOTION DEVICES

(71) Applicant: Nutanix, Inc., San Jose, CA (US)

(72) Inventors: Richard James Arsenian, San Francisco, CA (US); Adam Michael Fried-Gintis, West Hills, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 15/627,257

(22) Filed: Jun. 19, 2017

(65) Prior Publication Data

US 2017/0364079 A1 Dec. 21, 2017

Related U.S. Application Data

(60) Provisional application No. 62/352,518, filed on Jun. 20, 2016.

(51) Int. Cl.
G05D 1/02 (2006.01)
G05D 1/00 (2006.01)
B60W 30/00 (2006.01)
G06F 9/00 (2006.01)
B60W 50/00 (2006.01)

(52) U.S. Cl.
CPC .......... *G05D 1/0212* (2013.01); *B60W 30/00* (2013.01); *B60W 50/0098* (2013.01); *G05D 1/0022* (2013.01); *G05D 1/0202* (2013.01); *G05D 1/0206* (2013.01); *G06F 9/00* (2013.01); *B60W 2050/0002* (2013.01)

(58) Field of Classification Search
CPC .. G05D 1/0212; G05D 1/0202; G05D 1/0206; G05D 1/0022
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 2006/0015215 | A1* | 1/2006 | Howard ............... G05D 1/0094 700/245 |
| 2011/0035149 | A1 | 2/2011 | McAndrew et al. |
| 2014/0075506 | A1* | 3/2014 | Davis ..................... H04L 67/12 726/3 |
| 2014/0288813 | A1 | 9/2014 | Levien et al. |
| 2015/0225081 | A1 | 8/2015 | Stabler et al. |

(Continued)

OTHER PUBLICATIONS

International Search Report and Written Opinion issued on PCT/US2017/038264, dated Sep. 26, 2017.

(Continued)

Primary Examiner — Hussein Elchanti
(74) Attorney, Agent, or Firm — Foley & Lardner LLP

(57) ABSTRACT

Particular embodiments may provide a device capable of autonomous locomotion comprising means for autonomous locomotion, a device controller for navigation of the device by controlling the means for autonomous locomotion, and a host machine running a hypervisor, one or more user virtual machines (UVMs) and a virtual machine controller, wherein the host machine is communicably coupled to the device controller, and wherein at least one of the UVMs provides navigation instructions to the device controller.

11 Claims, 4 Drawing Sheets

(56) References Cited

U.S. PATENT DOCUMENTS

| | | | |
|---|---|---|---|
| 2015/0312774 A1 | 10/2015 | Lau | |
| 2015/0379874 A1 | 12/2015 | Ubhi et al. | |
| 2017/0126309 A1* | 5/2017 | Rupasinghe | H04B 7/18506 |
| 2017/0142072 A1* | 5/2017 | Reubenstein | H04L 63/0281 |
| 2017/0235316 A1* | 8/2017 | Shattil | B64C 39/024 |
| | | | 701/3 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

CONTROL SYSTEM FOR AUTONOMOUS LOCOMOTION DEVICES

PRIORITY

This application claims the benefit, under 35 U.S.C. § 119(e), of U.S. Provisional Patent Application No. 62/352,518, filed 20 Jun. 2016, which is incorporated herein by reference.

TECHNICAL FIELD

This disclosure generally relates to control systems for devices capable of autonomous locomotion.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Mobile devices capable of autonomous locomotion, such as unmanned aerial vehicles (UAVs), self-driving cars and trains, autonomous marine systems, robots, and other similar mobile devices may be controlled by a variety of methods (e.g., as provided by human operators), such as, by way of example and not limitation: direct control of the device's components (e.g., steering mechanism, throttle, brake(s), cameras, lights); task-level instructions (e.g., "at 3:45 PM on Jan. 23, 2016, driverless car to drive from 387 Soda Hall, Berkeley, Calif. 94720 to 475 Via Ortega, Stanford, Calif. 94305"); or mission-level instructions (e.g., "UAV swarm to monitor airspace around the airport, to provide alerts regarding significant changes in atmospheric conditions, lighting conditions, and chemical contamination, and to deter approach and intrusion by objects exceeding a specified size" or "vacuum floor daily at 11:00 AM").

Such mobile devices capable of autonomous locomotion have become increasingly commoditized, and technology that was once only available to the government for special military operations is available to private enterprises and individuals. Conventionally, such commoditized devices may be sold with a device controller. Such conventional device controllers may provide direct control of the device's components, and in some cases, may also or alternatively provide the ability to process task-level instructions or mission-level instructions.

SUMMARY OF PARTICULAR EMBODIMENTS

The present invention provides an architecture for implementing control systems for one or more mobile devices capable of autonomous locomotion using a virtualization environment. In particular embodiments, the virtualization environment may comprise clusters of hyperconverged computing systems. The mobile device may provide a hardware interface for providing control instructions by way of a direct connection (e.g., USB port) or wireless communications (e.g., 5G cellular, very small aperture terminal (VSAT) station), in addition to a software application programming interface (API) by which instructions may be provided to the mobile device, and data retrieved from and/or transmitted by the mobile device. In particular embodiments, the mobile device may be a third-party device with a control system connected to or installed or embedded in the mobile device. Together, the control system and the mobile device may operate as a host machine in a virtualization environment; in particular embodiments, a plurality of such mobile devices with corresponding control systems may operate as a cluster in the virtualization environment.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The present invention provides an architecture for implementing control systems for one or more mobile devices using a virtualization environment. In particular embodiments, the virtualization environment may comprise clusters of hyperconverged computing systems. The mobile device may provide a hardware interface for providing control instructions by way of a direct connection (e.g., USB port) or wireless communications (e.g., 5G cellular, very small aperture terminal (VSAT) station), in addition to a software application programming interface (API) by which instructions may be provided to the mobile device, and data retrieved from and/or transmitted by the mobile device. In particular embodiments, the mobile device may be a third-party device with a control system connected to or installed or embedded in the mobile device. Together, the control system and the mobile device may operate as a host machine in a virtualization environment; in particular embodiments, a plurality of such mobile devices with corresponding control systems may operate as a cluster in the virtualization environment.

Figure 1A:
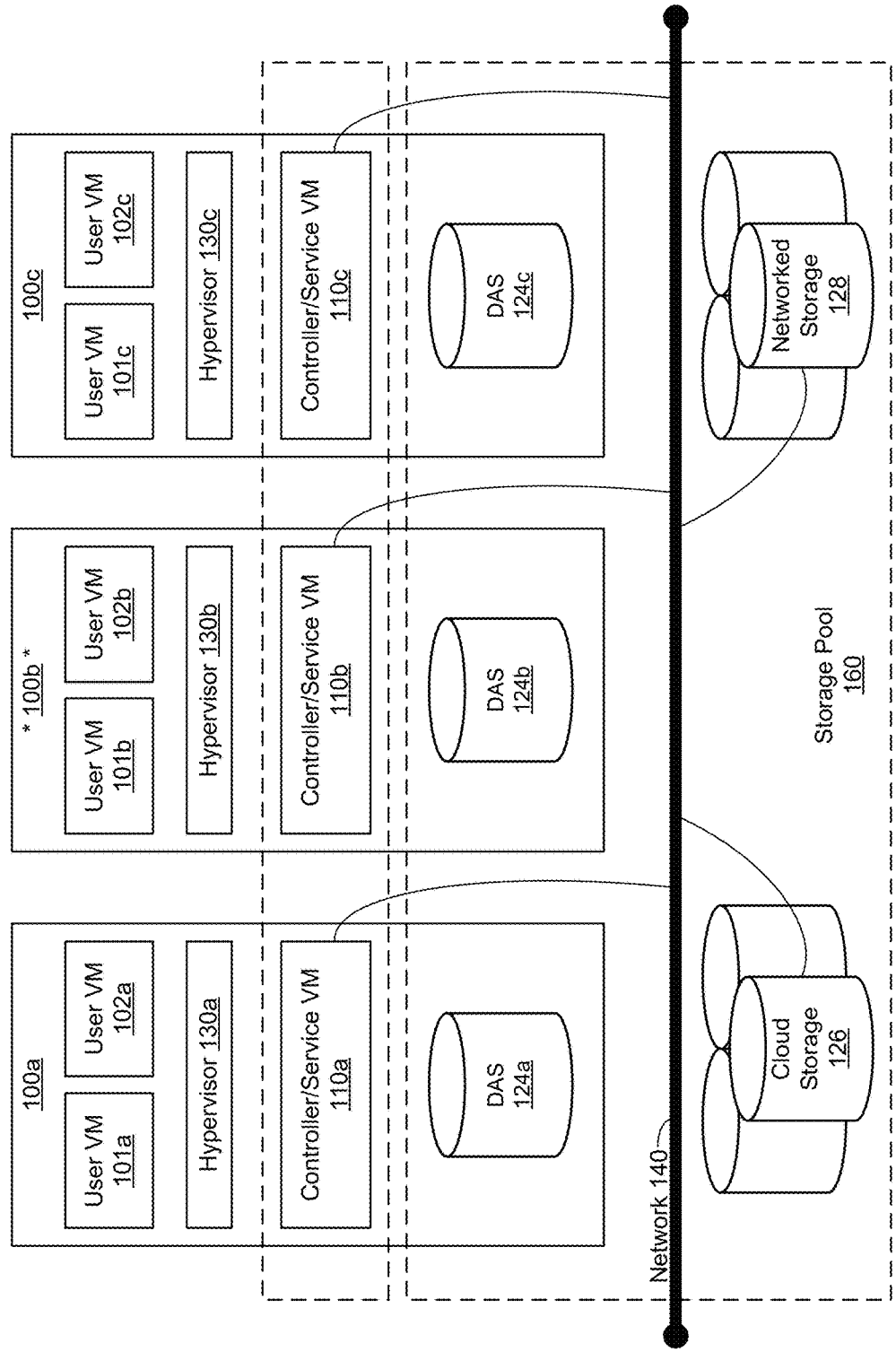
FIG. 1A illustrates a clustered virtualization environment according to some embodiments of the invention.

FIG. 1A illustrates a clustered virtualization environment according to some embodiments of the invention. The architecture of FIG. 1A can be implemented for a distributed platform that contains multiple hardware nodes 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits direct-attached storage (DAS) 124a-c that is within or directly attached to the server and/or appliance to be managed as part of storage pool 160. Examples of such storage include Solid State Drives (henceforth "SSDs"), Hard Disk Drives (henceforth "HDDs" or "spindle drives"), optical disk drives, external drives (e.g., a storage device connected to a hardware node via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each hardware node 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140.

Special VMs 110a-c are used to manage storage and input/output ("I/O") activities according to some embodiment of the invention, which are referred to herein as "Controller/Service VMs". These special VMs act as the storage controller in the currently described architecture. Multiple such storage controllers coordinate within a cluster to form a single-system. Controller/Service VMs 110a-c are not formed as part of specific implementations of hypervisors 130a-c. Instead, the Controller/Service VMs run as virtual machines on the various hardware nodes 100, and work together to form a distributed system 110 that manages all the storage resources, including DAS 124a-c, networked storage 128, and cloud storage 126. The Controller/Service VMs may connect to network 140 directly, or via a hypervisor. Since the Controller/Service VMs run independent of hypervisors 130a-c, this means that the current approach can be used and implemented within any virtual machine architecture, since the Controller/Service VMs of embodiments of the invention can be used in conjunction with any hypervisor from any virtualization vendor.

A hardware node may be designated as a leader node. For example, hardware node 100b, as indicated by the asterisks, may be a leader node. A leader node may have a software component designated as a leader. For example, a software component of Controller/Service VM 110b may be designated as a leader. A leader may be responsible for monitoring or handling requests from other hardware nodes or software components on other hardware nodes throughout the virtualized environment. If a leader fails, a new leader may be designated. In particular embodiments, a management module (e.g., in the form of an agent) may be running on the leader node.

Each Controller/Service VM 110a-c exports one or more block devices or NFS server targets that appear as disks to user VMs 101a-c and 102a-c. These disks are virtual, since they are implemented by the software running inside Controller/Service VMs 110a-c. Thus, to user VMs 101a-c and 102a-c, Controller/Service VMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize DAS 124 as disclosed herein. This is because I/O performance is typically much faster when performing access to DAS 124 as compared to performing access to networked storage 128 across a network 140. This faster performance for locally attached storage 124 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
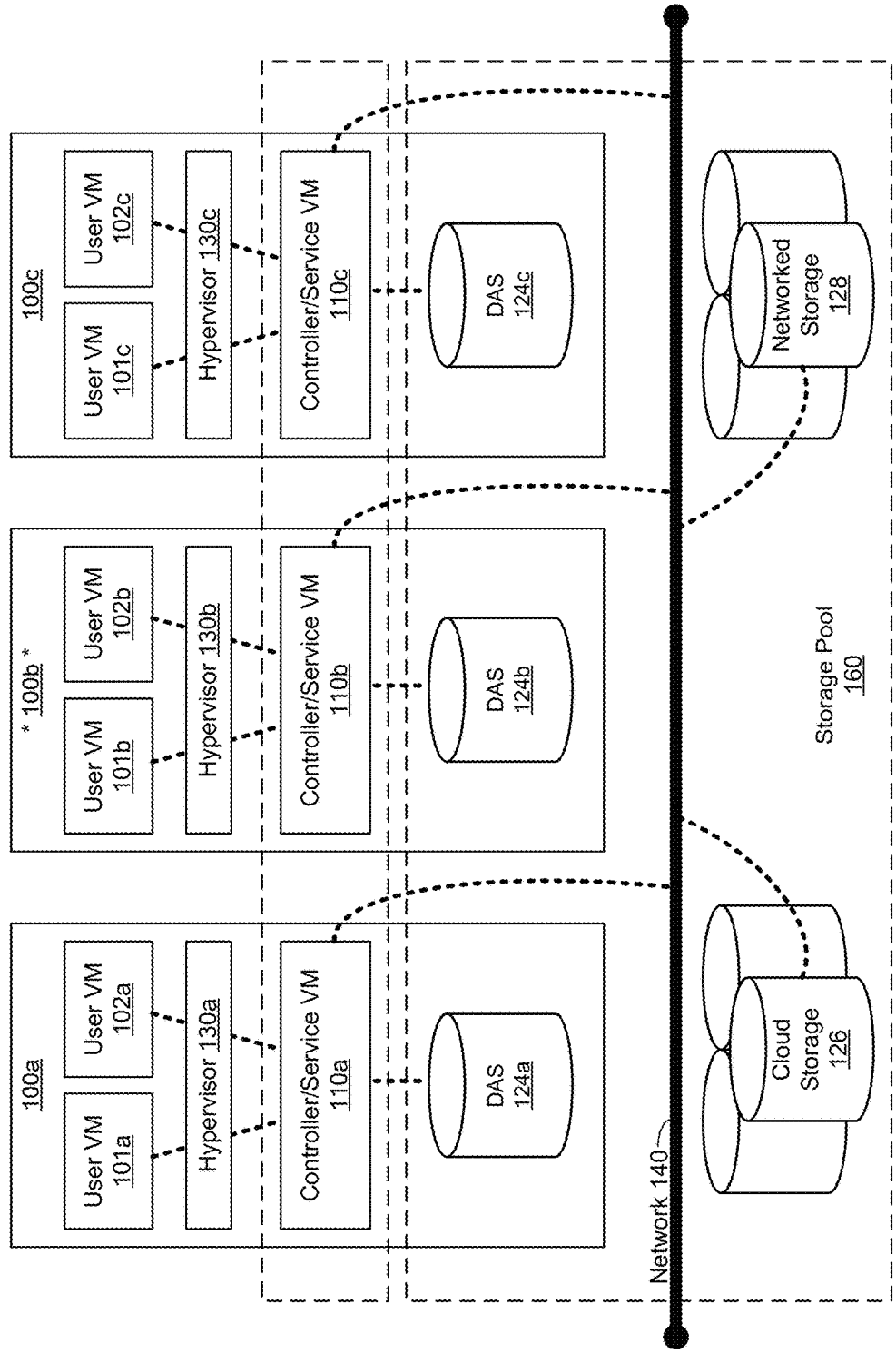
FIG. 1B illustrates data flow within a clustered virtualization environment according to some embodiments of the invention.

FIG. 1B illustrates data flow within an example clustered virtualization environment according to some embodiments of the invention. As described above, one or more user VMs and a Controller/Service VM may run on each hardware node 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, Controller/Service VM 110a-c may present an emulated storage controller either to the hypervisor or to user VMs to facilitate I/O operations. Controller/Service 110a-c may be connected to storage within storage pool 160. Controller/Service VM 110a may have the ability to perform I/O operations using DAS 124a within the same hardware node 100a, by connecting via network 140 to cloud storage 126 or networked storage 128, or by connecting via network 140 to DAS 124b-c within another node 100b-c (e.g., via connecting to another Controller/Service VM 110b-c). In particular embodiments, any suitable computing system 400 may be used to implement a hardware node 100.

Figure 2:
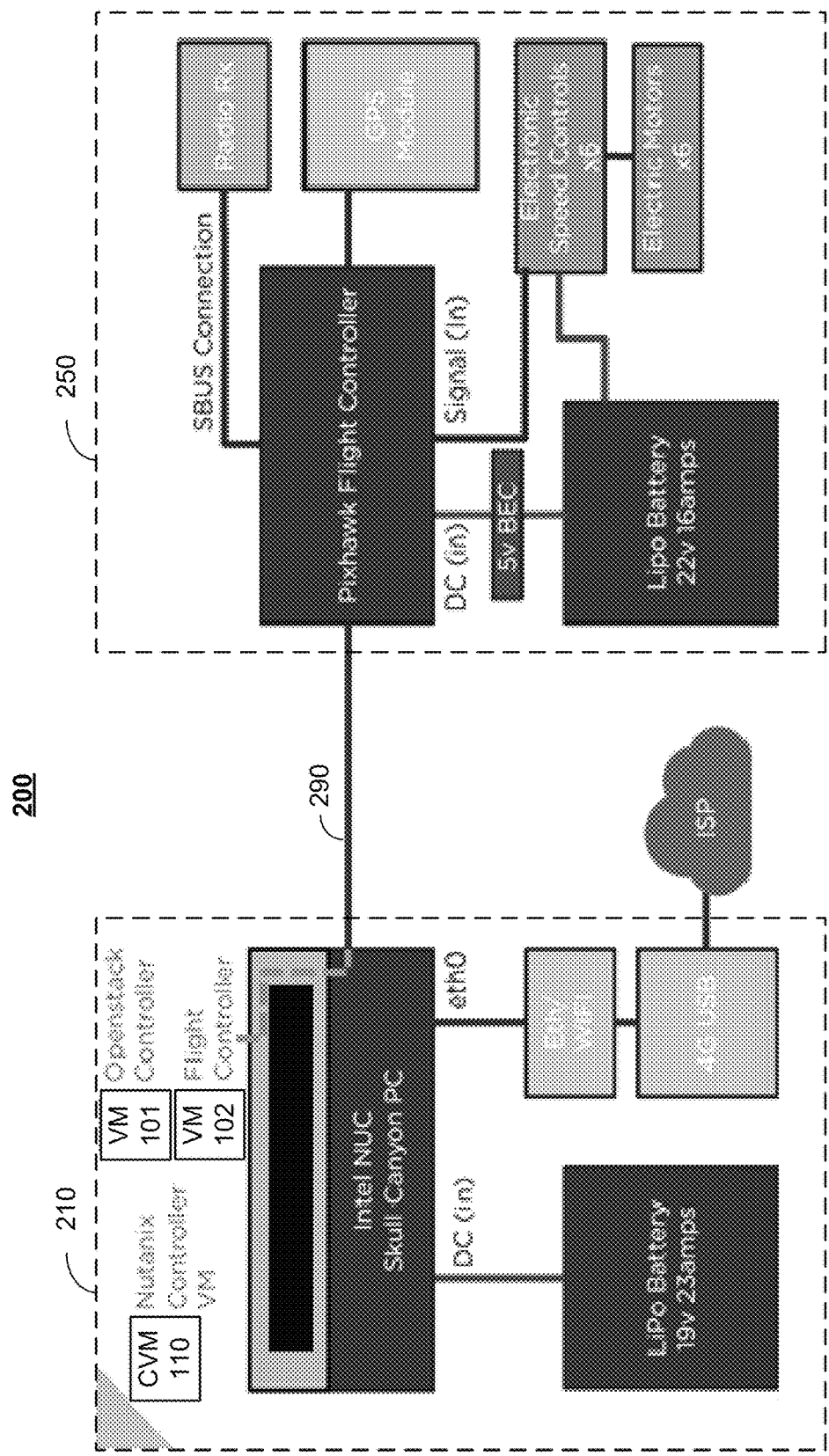
FIG. 2 illustrates an example architecture for implementing a control system for an unmanned aerial vehicle (UAV) using a virtualization environment.

FIG. 2 illustrates an example architecture for implementing a control system for a mobile device capable of autonomous locomotion 200 using a virtualization environment running in an on-board hardware module 210. As shown in FIG. 2, hardware module 210 comprising a computing device (e.g., the INTEL NUC computing device), a battery, and a Wi-Fi networking port may be running a hypervisor 130 (e.g., the ACROPOLIS hypervisor) and associated VMs 101, 102, and 110 (as further described in FIGS. 1A and 1B). The Wi-Fi networking port may further be connected to a cellular (e.g., 4G) transceiver. This on-board hardware module may be connected to the mobile device by communication link 290. The mobile device may include a mobile device controller 250 (e.g., PIXHAWK flight controller for a UAV), which may have its own battery, a navigation system (e.g., GPS module), a radio transceiver (e.g., Radio RX), and electronic component controls, which may drive one or more electric motors. In particular embodiments, the hardware module may be directly connected using any appropriate physical communication link 290 (e.g., USB, Firewire, optical cable), or it may be installed or embedded in the mobile device, or it may be physically attached to the mobile device but in wireless communication with the mobile device (e.g., where communication link 290 comprises a Wi-Fi, NFC, Bluetooth, or other appropriate wireless communication technology). In particular embodiments, the hardware module and/or the mobile device may utilize a special component (e.g., FIPS-140-2 certified SSD (M.2) form factor drives in the Intel NUC) to render any stored data inaccessible in the event of a crash or disappearance of the mobile device. Although FIG. 2 illustrates the hardware module and the mobile device as having separate batteries, in particular embodiments, the hardware module may draw power from the mobile device (or vice versa). In particular embodiments, the hardware module and/or the mobile device may generate power using solar, wind, hydroelectric, marine current power, biochemical, or other power generation techniques. Although the example shown in FIG. 2 illustrates the mobile device as a UAV, any suitable mobile device capable of autonomous locomotion and of hosting a hardware module as described above may be utilized (e.g., self-driving cars and trains, autonomous marine systems, robots, and other similar mobile devices).

As shown in FIG. 2, in addition to the Controller/Service VM 110, the hardware module may have user VMs running cloud computing platform software (e.g., OPENSTACK on VM 101) and a mobile device controller (e.g., the flight controller on VM 102). The flight controller software running on VM 102 may communicate with the mobile device controller running on the mobile device. In particular embodiments, user VMs running on the hardware module may be able to dynamically install new applications and/or modify existing applications appropriately (e.g., to enable handling new task-level instructions or mission-level instructions, or to enable the mobile device to join, separate from, or take over leadership of a "swarm" of other mobile devices equipped with hardware module 210 or an equivalent, which may be acting as a single cluster in the virtualization environment). In particular embodiments, where a plurality of such mobile devices are organized in a cluster, a particular one of the mobile devices designated as the leader node may communicate with other nodes (at least some of which may be mobile devices) in the cluster to move in a coordinated fashion (e.g., like a swarm, herd, or military unit of soldiers). In particular embodiments, the leader node may be able to execute special functions such as, by way of example and not limitation: pulling additional nodes into the cluster from geographically proximate clusters, discharging nodes from the cluster (and releasing them to either return to a "base station" or to the cluster from which they were pulled), instructing nodes in the cluster to install particular software or update configuration files or metadata, instructing nodes in the cluster to obtain additional resources or upgrade their resources (e.g., by instructing the mobile device to fly to a location where it can get additional sensors installed, upgrade its processor, have maintenance performed, or re-charge its battery, then fly back to rejoin the cluster), and decommissioning nodes in the cluster. The virtualization cluster may thus be able to handle failover, provide high availability, and enable scalability using these and other techniques.

In particular embodiments, by installing hardware nodes of a virtualization environment on such mobile devices, highly dynamic and geographically flexible clusters may be enabled, since such mobile server-side resources may be easily physically moved to handle anticipated temporary increases in demand for computing and networking resources in a particular geographic region (e.g., due to a business conference, gaming/entertainment event, law enforcement or military initiative) or to adapt to sudden and extreme failures in a particular geographic region (e.g., due to natural or man-made disasters that have disabled a data center or disrupted network connectivity or an electrical power grid). In particular embodiments, by installing a subset of hardware nodes of a virtualization environment on such mobile devices, such mobile nodes may be able to provide real-time sensor data collection and analysis, enable data forwarding to and caching at the edges of a geographically dynamic network, and fill in coverage gaps in a wireless mesh network.

Figure 3:
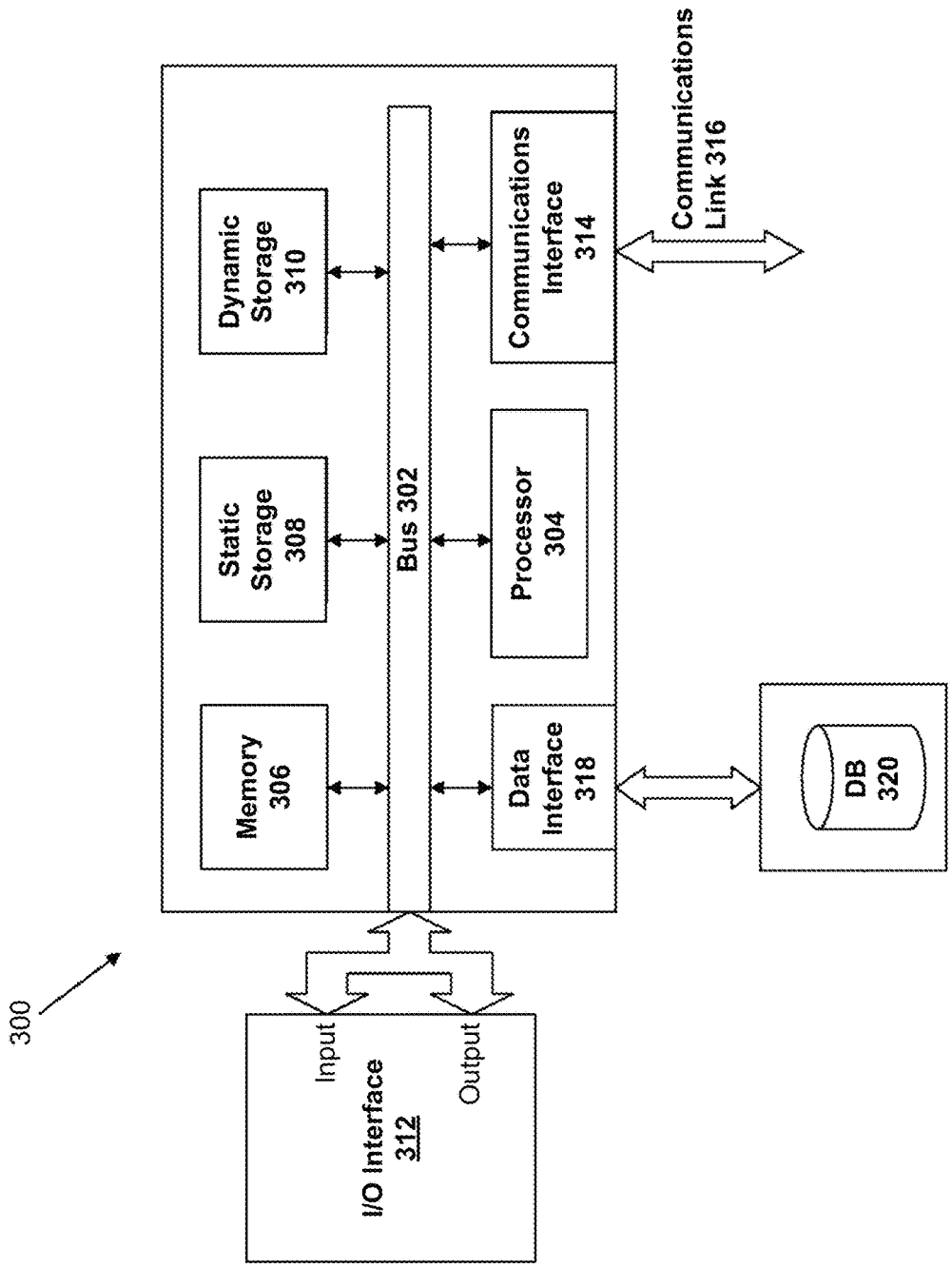
FIG. 3 illustrates a block diagram of a computing system suitable for implementing an embodiment of the present invention.

FIG. 3 is a block diagram of an illustrative computing system 300 suitable for implementing an embodiment of the present invention. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

Computer system 300 includes a bus 302 (e.g., an address bus and a data bus) or other communication mechanism for communicating information, which interconnects subsystems and devices, such as processor 304, memory 306 (e.g., RAM), static storage 308 (e.g., ROM), dynamic storage 310 (e.g., magnetic or optical), communication interface 314 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 312 (e.g., keyboard, keypad, mouse, microphone). In particular embodiments, computer system 300 may include one or more of any such components.

In particular embodiments, processor 304 includes hardware for executing instructions, such as those making up a computer program. As an example and not by way of limitation, to execute instructions, processor 304 may retrieve (or fetch) the instructions from an internal register, an internal cache, memory 306, static storage 308, or dynamic storage 310; decode and execute them; and then write one or more results to an internal register, an internal cache, memory 306, static storage 308, or dynamic storage 310. In particular embodiments, processor 304 may include one or more internal caches for data, instructions, or addresses. This disclosure contemplates processor 304 including any suitable number of any suitable internal caches, where appropriate. As an example and not by way of limitation, processor 304 may include one or more instruction caches, one or more data caches, and one or more translation lookaside buffers (TLBs). Instructions in the instruction caches may be copies of instructions in memory 306, static storage 308, or dynamic storage 310, and the instruction caches may speed up retrieval of those instructions by processor 304. Data in the data caches may be copies of data in memory 306, static storage 308, or dynamic storage 310 for instructions executing at processor 304 to operate on; the results of previous instructions executed at processor 304 for access by subsequent instructions executing at processor 304 or for writing to memory 306, static storage 308, or dynamic storage 310; or other suitable data. The data caches may speed up read or write operations by processor 304. The TLBs may speed up virtual-address translation for processor 304. In particular embodiments, processor 304 may include one or more internal registers for data, instructions, or addresses. This disclosure contemplates processor 304 including any suitable number of any suitable internal registers, where appropriate. Where appropriate, processor 304 may include one or more arithmetic logic units (ALUs); be a multi-core processor; or include one or more processors 302. Although this disclosure describes and illustrates a particular processor, this disclosure contemplates any suitable processor.

In particular embodiments, I/O interface 312 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 312 for them. Where appropriate, I/O interface 312 may include one or more device or software drivers enabling processor 304 to drive one or more of these I/O devices. I/O interface 312 may include one or more I/O interfaces 312, where appropriate. Although this disclosure describes and illustrates a particular I/O interface, this disclosure contemplates any suitable I/O interface.

In particular embodiments, communication interface 314 includes hardware, software, or both providing one or more interfaces for communication (such as, for example, packet-based communication) between computer system 300 and one or more other computer systems 300 or one or more networks. As an example and not by way of limitation, communication interface 314 may include a network interface controller (NIC) or network adapter (e.g., a WI-FI adapter, a cellular modem, optical transceiver, or a VSAT station or module) for communicating with an Ethernet or other wire-based network or a wireless NIC (WNIC) or wireless adapter for communicating with a wireless network, such as a WI-FI network. This disclosure contemplates any suitable network and any suitable communication interface 314 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular data network (such as, for example, a 4G or 5G network), a satellite, or other suitable wireless network or a combination of two or more of these. Computer system 300 may include any suitable communication interface 314 for any of these networks, where appropriate. Communication interface 314 may include one or more communication interfaces 314, where appropriate. Although this disclosure describes and illustrates a particular communication interface, this disclosure contemplates any suitable communication interface.

One or more memory buses (which may each include an address bus and a data bus) may couple processor 304 to memory 306. Bus 302 may include one or more memory buses, as described below. In particular embodiments, one or more memory management units (MMUs) reside between processor 304 and memory 306 and facilitate accesses to memory 306 requested by processor 304. In particular embodiments, memory 306 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 306 may include one or more memories 306, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 310 may include a hard disk drive (HDD), a floppy disk drive, flash memory, an optical disc, a magneto-optical disc, magnetic tape, or a Universal Serial Bus (USB) drive or a combination of two or more of these. Dynamic storage 310 may include removable or non-removable (or fixed) media, where appropriate. Dynamic storage 310 may be internal or external to computer system 300, where appropriate. This disclosure contemplates mass dynamic storage 310 taking any suitable physical form. Dynamic storage 310 may include one or more storage control units facilitating communication between processor 304 and dynamic storage 310, where appropriate.

In particular embodiments, bus 302 includes hardware, software, or both coupling components of computer system 300 to each other. As an example and not by way of limitation, bus 302 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 302 may include one or more buses 306, where appropriate. Although this disclosure describes and illustrates a particular bus, this disclosure contemplates any suitable bus or interconnect.

According to one embodiment of the invention, computer system 300 performs specific operations by processor 304 executing one or more sequences of one or more instructions contained in memory 306. Such instructions may be read into memory 306 from another computer readable/usable medium, such as static storage 308 or dynamic storage 310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 304 for execution. Such a medium may take many forms, including but not limited to, nonvolatile media and volatile media. Non-volatile media includes, for example, optical or magnetic disks, such as static storage 308 or dynamic storage 310. Volatile media includes dynamic memory, such as memory 306.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 300. According to other embodiments of the invention, two or more computer systems 300 coupled by communication link 316 (e.g., LAN, PTSN, or wireless network) may perform the sequence of instructions required to practice the invention in coordination with one another.

Computer system 300 may transmit and receive messages, data, and instructions, including program, i.e., application code, through communication link 316 and communication interface 314. Received program code may be executed by processor 304 as it is received, and/or stored in static storage 308 or dynamic storage 310, or other non-volatile storage for later execution. A database 320 may be used to store data accessible by the system 300 by way of data interface 318.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a plurality of host machines forming a virtual cluster in a virtualization environment, each of the plurality of host machines forming an autonomous locomotion device of a plurality of autonomous locomotion devices, each of the plurality of autonomous locomotion devices comprising:
   a hardware module comprising a virtual machine configured as a flight controller; and
   a device controller communicably connected to the hardware module for operating an associated one of the plurality of autonomous locomotion devices based upon an instruction from the hardware module,
   wherein the plurality of host machines form a distributed system in which user data, application data, or sensor data associated with each of the plurality of host machines is replicated dynamically by other ones of the plurality of host machines in response to instructions to perform a new task, mission, or to enable another host machine to join, separate from, or take over leadership of the virtual cluster;
   wherein one of the plurality of host machines is a leader of the virtual cluster, and wherein the leader dynamically varies a number of the plurality of host machines that form part of the virtual cluster.

2. The system of claim 1, wherein the leader controls remaining ones of the plurality of host machines in the virtual cluster.

3. The system of claim 2, wherein the leader dynamically adds additional ones of the plurality of host machines to the virtual cluster.

4. The system of claim 2, wherein the leader dynamically removes one or more of the plurality of host machines from the virtual cluster.

5. The system of claim 2, wherein the leader dynamically updates hardware and software resources of the remaining ones of the plurality of host machines in the virtual cluster.

6. A virtual system comprising:
   a plurality of host machines, each of the plurality of host machines forming an autonomous locomotion device of a plurality of autonomous locomotion devices, each of the plurality of autonomous locomotion devices comprising:
   a device controller; and
   a flight controller communicably coupled to the device controller for controlling an associated one of the plurality of autonomous locomotion devices, wherein each of the plurality of host machines is part of a virtual cluster;
   wherein the plurality of host machines form a distributed system in which user data, application data, or sensor data associated with each of the plurality of host machines is replicated dynamically by other ones of the plurality of host machines in response to an instruction to perform a new task, mission, or to enable another host machine to join, separate from, or take over leadership of the virtual cluster;
   wherein one of the plurality of host machines is a leader of the virtual cluster, and wherein the leader dynamically varies a number of the plurality of host machines that form cart of the virtual cluster.

7. The virtual system of claim 6, wherein the leader dynamically adds new host machines to the virtual cluster from a neighboring cluster.

8. The virtual system of claim 6, wherein the leader dynamically removes one or more of the plurality of host machines from the virtual cluster.

9. The virtual system of claim 6, wherein the leader communicates with other ones of the plurality of host machines in the virtual cluster to move in a coordinated fashion.

10. The virtual system of claim 6, wherein the leader dynamically receives the instruction for the new task, and wherein the leader controls other ones of the plurality of host machines in the virtual cluster based on the instruction for performing the new task.

11. The virtual system of claim 6, wherein each of the plurality of host machines comprises a virtual machine, and wherein the flight controller of each of the plurality of host machines resides on the virtual machine.

* * * * *